United States Patent
Lin et al.

(10) Patent No.: US 7,418,727 B2
(45) Date of Patent: Aug. 26, 2008

(54) METHOD FOR PC CLIENT SECURITY AUTHENTICATION

(75) Inventors: Haitao Lin, Shenzhen (CN); Quan Gan, Shenzhen (CN); Shuiyang Chen, Shenzhen (CN); Xiaolan Wang, Shenzhen (CN)

(73) Assignee: Huawei Technologies Co., Ltd (CN)

( * ) Notice: Subject to any disclaimer, the term of this patent is extended or adjusted under 35 U.S.C. 154(b) by 619 days.

(21) Appl. No.: 10/491,093

(22) PCT Filed: Jun. 7, 2002

(86) PCT No.: PCT/CN02/00408

§ 371 (c)(1), (2), (4) Date: Mar. 29, 2004

(87) PCT Pub. No.: WO03/030464

PCT Pub. Date: Apr. 10, 2003

(65) Prior Publication Data

US 2004/0255158 A1    Dec. 16, 2004

(30) Foreign Application Priority Data

Sep. 29, 2001 (CN) ................... 01 1 41650

(51) Int. Cl.
*G06F 7/04* (2006.01)
*H04L 9/00* (2006.01)
*H04K 1/00* (2006.01)

(52) U.S. Cl. .................... 726/5; 713/168; 380/258
(58) Field of Classification Search ............ 726/5; 713/168; 380/258
See application file for complete search history.

(56) References Cited

U.S. PATENT DOCUMENTS 5,864,665 A * 1/1999 Tran ..................... 726/10

(Continued)

FOREIGN PATENT DOCUMENTS

| WO | WO/9959375 | 11/1999 |
|---|---|---|
| WO | WO/0129757 | 4/2001 |

OTHER PUBLICATIONS

International Search Report for PCT/CN02/00408, mailed Dec. 12, 2002.

*Primary Examiner*—Emmanuel L Moise
*Assistant Examiner*—Techane J Gergiso

(57) ABSTRACT

A security authentication for PC client is provided according to the present invention, wherein said method includes: PC client sends a registry request to a server with a user ID and a password; The server makes first authentication based on the user ID and password, if the authentication succeeds, a field used for re-authentication will be created and returned to the PC client through an authentication successful message; When initiating a call, the PC client transmits the user ID and the field used for re-authentication acquired when registered to media gateway controller; The media gateway controller transfers the user ID and field used for re-authentication to the server, which makes second authentication according to the user ID and the field used for the second authentication, if the authentication fails, the call will be rejected, otherwise the call will be accepted and returns information of the called subscriber. The present invention successfully associates call and subscriber registry together, preferably solves security problems of the having registered legal PC subscriber and largely improves security performance when the subscriber uses the resources.

5 Claims, 1 Drawing Sheet

U.S. PATENT DOCUMENTS

| | | | | |
|---|---|---|---|---|
| 5,991,623 A * | 11/1999 | Ohta et al. | ............... | 455/435.1 |
| 6,065,120 A * | 5/2000 | Laursen et al. | ................. | 726/5 |
| 6,182,142 B1 * | 1/2001 | Win et al. | .................. | 709/229 |
| 6,243,816 B1 * | 6/2001 | Fang et al. | ..................... | 726/5 |
| 6,338,140 B1 * | 1/2002 | Owens et al. | ............... | 713/168 |
| 6,763,468 B2 * | 7/2004 | Gupta et al. | .................. | 726/2 |
| 6,904,526 B1 * | 6/2005 | Hongwei | .................... | 713/182 |
| 6,976,164 B1 * | 12/2005 | King et al. | .................. | 713/156 |
| 6,985,583 B1 * | 1/2006 | Brainard et al. | ............... | 380/44 |
| 7,010,600 B1 * | 3/2006 | Prasad et al. | ................ | 709/225 |
| 7,024,692 B1 * | 4/2006 | Schanze et al. | ............... | 726/10 |
| 7,089,310 B1 * | 8/2006 | Ellerman et al. | ............ | 709/227 |
| 7,158,776 B1 * | 1/2007 | Estes et al. | ................... | 455/411 |
| 7,181,762 B2 * | 2/2007 | Jerdonek | ....................... | 726/2 |
| 2001/0037469 A1 * | 11/2001 | Gupta et al. | ................ | 713/202 |
| 2001/0045451 A1 * | 11/2001 | Tan et al. | .................... | 235/375 |
| 2002/0031225 A1 * | 3/2002 | Hines | ......................... | 380/247 |
| 2002/0071565 A1 * | 6/2002 | Kurn et al. | .................. | 380/281 |
| 2002/0099942 A1 * | 7/2002 | Gohl | ........................ | 713/169 |
| 2002/0104025 A1 * | 8/2002 | Hongwei | .................... | 713/182 |

* cited by examiner

METHOD FOR PC CLIENT SECURITY AUTHENTICATION

FIELD OF THE TECHNOLOGY

The present invention generally relates to IP communication technology field and more particularly, to a security authentication method for PC client.

BACKGROUND OF THE INVENTION

All kinds of PC security authentication methods in prior art are once-authentication, i.e. the PC client only needs to send a registry request to a Server while the PC client logging in, once the user identifier such as ID number and password passes authentication made by the Server, said PC will be able to access the services legally, which means the Server will no longer identify the PC client is legal or not when the PC utilizes the services.

The once-authentication method in prior art may give chances to illegal PC users to embezzle legal accounts. The FIG. 1 shows a flow graph of PC client authentication and utilization in a more typical ICW (Internet Call Waiting) service, wherein, Internet personal number (IPN) represents ID number such as account number or other various service numbers which can identify a subscriber. As shown in the drawings, if a legal subscriber has succeeded in the PC registry authentication, a wiser illegal PC subscriber can overleap the step of PC registry authentication, and use the number directly to initiate calls, occupying charge and resources of the legal subscriber.

SUMMARY OF THE INVENTION

The present invention provides a dual authentication method for security authentication of a PC client in order to solve security problems of the PC client.

A security authentication method for a PC client, wherein includes following steps.

The PC client sends a registry request to a user server with a user ID and a password; the user server carries out a first authentication according to the user ID and the password, if the first authentication is successful, a field used for a re-authentication is created, and returned to the PC client through a message informing that the authentication has been passed.

When the PC client initiates calls, the user ID and the field used for re-authentication acquired during registering as well as a calling number and a called number will be transmitted to a service server. The service server then transfers the user ID and the field used for re-authentication as well as a calling number and a called number to the user server, according to which the server, implements a second authentication, if the authentication fails, the call will be rejected, otherwise the user server accepts the call and returns information of the called subscriber to the service server. The service server accepts the call and establishing the call.

Said field used for the re-authentication may either be a random variable, or an encrypted key produced by the server and so on.

Said user ID number may be an account number and other various service numbers that are used to identify the subscriber.

By associating the call and registry together, the present invention preferably solves the security problems of PC subscribers who have registered legally using the service, and largely increases the security in utilizing the subscriber resources.

EMBODIMENTS OF THE INVENTION

The present invention associates the call and registry together. At the time when the subscriber logs in, a first authentication is performed, and once the first authentication is successful, a field is created which used for afterward re-authentication, and then it will be returned to the PC client. In the subsequent call process, the PC client should, besides information of the calling and called subscribers, upload the acquired security authentication field, to ensure that the User Server implements re-authentication based on the information about the calling subscriber and the security authentication field.

The method provided in the present invention can be applied in any IP communication services. Taken in conjunction with the accompanying drawings and personal number service (ONLY) as an example, features and applications of the present invention will be hereinafter discussed.

As a creative service syncretized traditional telecommunication and IP techniques, ONLY (One Number Link You) service is developed along with the development of Internet, which mainly aims to satisfy the increasingly urgent needs of the subscribers to communicate and get information at anywhere and anywhere. When utilizing the ONLY service, the subscribers need to simply apply for an ONLY number, with which no matter where the subscriber goes, other people can contact him conveniently through telephone, PC and other means through his ONLY number.

Figure 1:
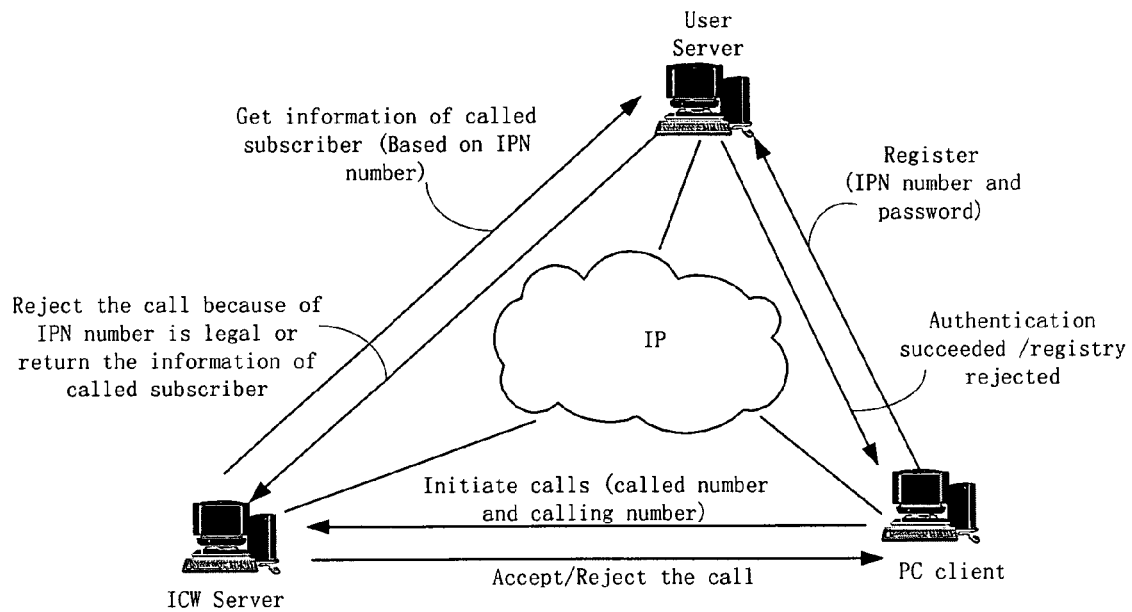
FIG. 1 shows the authentication flow graph of PC client in prior art ICW service.
Figure 2:
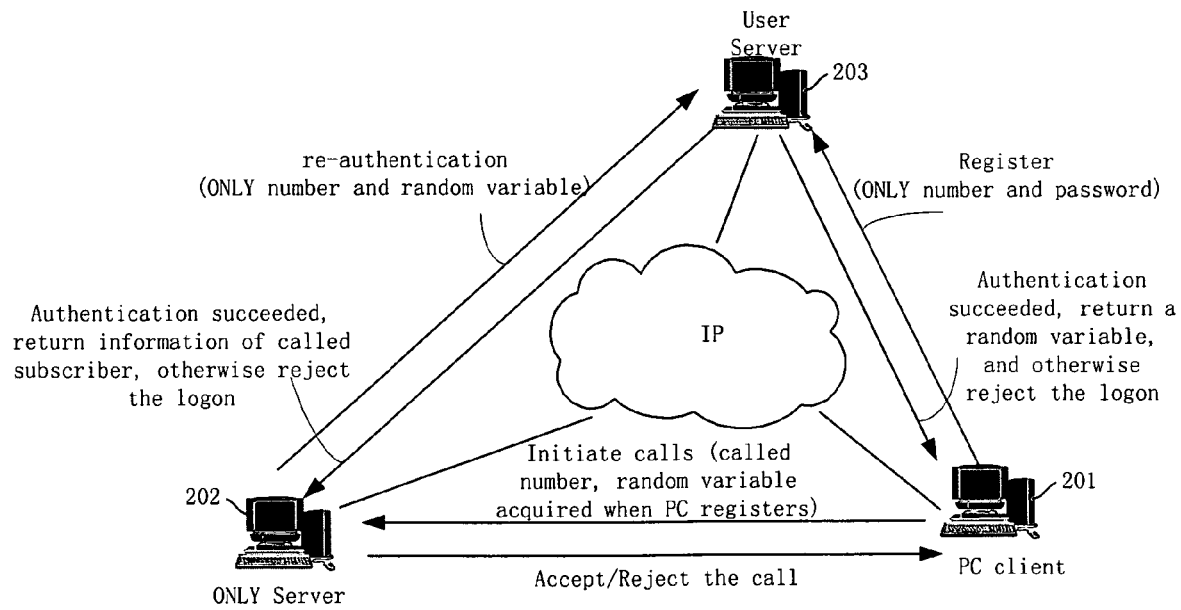
FIG. 2 is an authentication flow graph for PC client in ONLY service according to the present invention.

FIG. 2 illustrates an authentication flow graph of PC client in the ONLY service according to the present invention. Wherein said security authentication includes the steps as following.

1, the ONLY service subscriber initiates a registry request to User Server 203 with his ONLY Number and password;

2, User Server 203 makes authentication based on the ONLY Number and the password; if the number does not match the password, or the number is illegal, the logon will be rejected, otherwise the authentication will be thought as successful; and then User Server 203 produces and returns a random variable to the PC client 201. Once the authentication succeeds, PC client 201 may initiates call at any time;

3, PC client 201 initiates a call to ONLY Server 202; during this period, the client must send the random variable which is acquired during registering to the ONLY Server 202, besides the calling and called numbers;

4, after receiving the call from PC client 201, ONLY Server 202 transmits a call request with the calling and called numbers as well as the random variable to User Server 203;

5, User Server 203 will then implement the second authentication according to the calling ONLY Number and random variable; if the second authentication fails, the call will be rejected, otherwise, the call will be accepted and User Server 203 returns information of the called subscriber to ONLY Server 202;

6, ONLY Server 202 accepts the call, sends a start call message to PC client 201, and then starts to establish calls.

Wherein, the ID number used for subscriber identification is ONLY Number of the ONLY service subscriber. The ID number can also be other identification numbers such as account number. The field used for the re-authentication created by the server is either a random variable, or an encrypted key.

From the authentication process discussed above we can see that, with the dual authentication method, security problems that troubles the resource utilization of legal registered PC subscribers can be solved, and the resource embezzlement of the legal PC registered subscribers can be eradicated. The method can also largely improve security performance of the resource utilization.

The present invention associates subscriber registry and call together; when the subscriber logs on and makes his first security authentication, a field used for authentication is created; it is necessary to carry this field at the time of initiating calls, in order to make the security re-authentication, only when both of the dual security authentications are successful, the call can be accepted and be established. Any changes, modifications and improvements made without departing from the spirit and principle of the present invention should be covered within the claims of the present invention.

The invention claimed is:

1. A security authentication method for a PC client, comprising:

sending by the PC client a registry request to a user server with a user ID and a password; performing, by the user server, a first authentication based on the user ID and the password, if the first authentication being successful, creating a field used for re-authentication and returning the field to the PC client through an authentication successful message;

when initiating a call each time, transmitting, by the PC client, the user ID and the field returned by the user server as well as a calling number and a called number to a service server;

transferring, by the service server, a request for re-authentication including the user ID and the field as well as the calling number and the called number to the user server each time the service server receives a call from the PC client;

performing, by the user server, a second authentication based on the user ID and the field each time the user server receives the request for re-authentication, and if the second authentication fails, rejecting the call, otherwise accepting the call and returning information of a called subscriber to the service server; and accepting, by the service server after the second authentication, the call and establishing the call.

2. The security authentication method according to claim 1, wherein a random variable produced by the user server is stored in the field used for re-authentication.

3. The security authentication method according to claim 1, wherein an encrypted key produced by the user server is stored in the field used for re-authentication.

4. The security authentication method according to claim 1, wherein said user ID is an account number of the subscriber.

5. The security authentication method according to claim 1, wherein said user ID is a service number of the subscriber.

* * * * *